Dec. 5, 1961 B. L. MIMS 3,011,364
BALL BEARING SPEED REDUCER
Filed Feb. 4, 1959 2 Sheets-Sheet 1
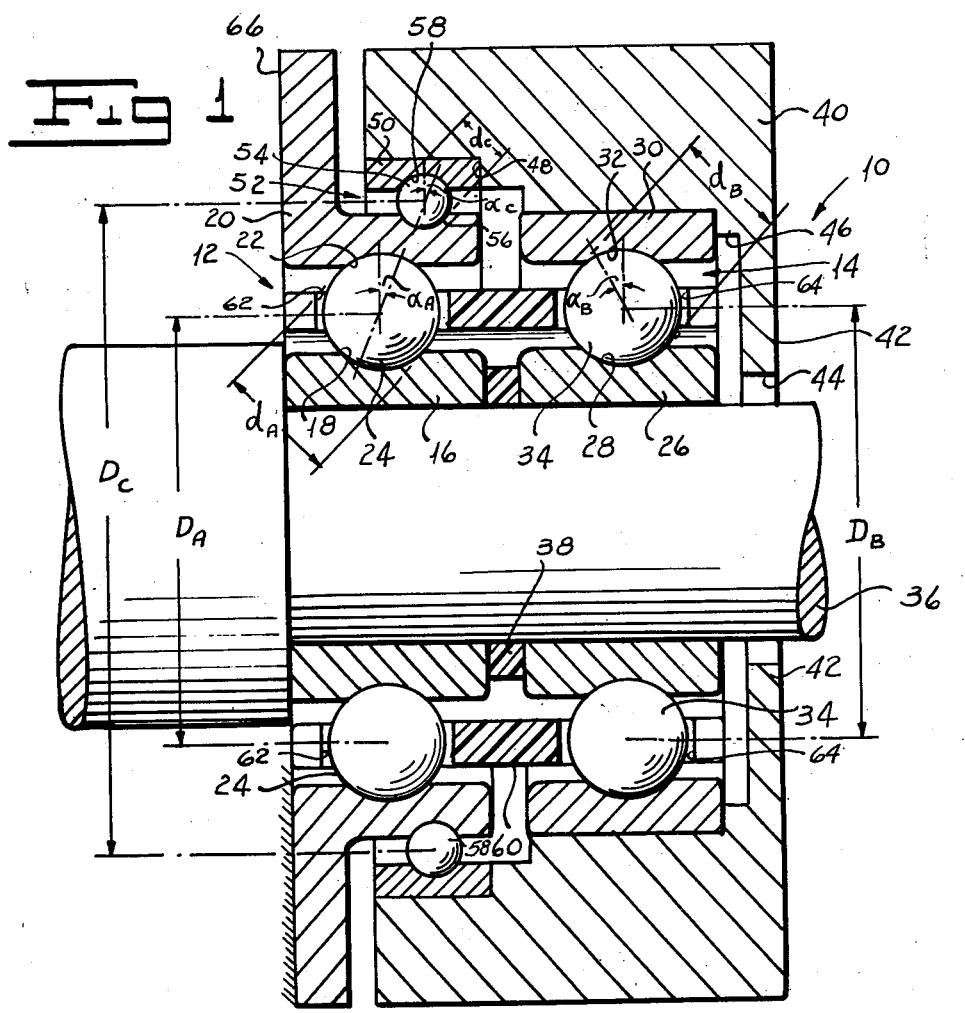
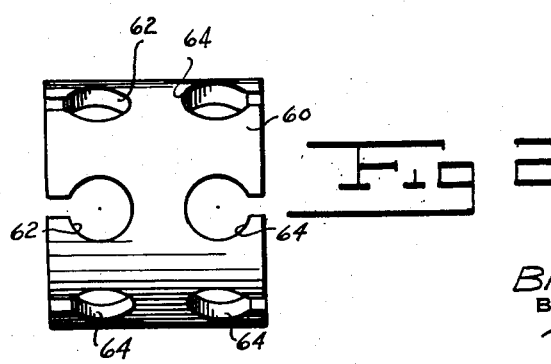
INVENTOR
BRUCE L. MIMS
BY
ATTORNEY Dec. 5, 1961    B. L. MIMS    3,011,364
BALL BEARING SPEED REDUCER
Filed Feb. 4, 1959    2 Sheets-Sheet 2

INVENTOR
BRUCE L. MIMS

BY Henry L. Thenier
ATTORNEY

United States Patent Office 3,011,364
Patented Dec. 5, 1961

3,011,364
BALL BEARING SPEED REDUCER
Bruce L. Mims, Danbury, Conn., assignor to The Barden Corporation, Danbury, Conn., a corporation of Connecticut
Filed Feb. 4, 1959, Ser. No. 791,104
5 Claims. (Cl. 74—798)

My invention relates to a speed reducer and more particularly to a ball bearing speed reducer which embodies many advantages over speed reducers known in the prior art.

The usual type of speed reducer known in the prior art employs a pair of mating toothed elements such as gears carried by respective shafts between which it is desired to provide the speed change. These speed reducing devices embody a number of disadvantages. The input and output shafts of the systems are not co-axial, as is desirable in many cases. These systems have an undesirable vibration known as "gear chatter." Where a large speed change is required, systems known in the art are of such a size that they occupy an inordinate amount of space. In other words, the speed reduction which may be accomplished in a given space by speed reducers of the prior art is severely limited.

I have invented a ball bearing speed reducer which overcomes the disadvantages of speed reducers of the prior art pointed out hereinabove. My speed reducer provides co-axial input and output shafts. My speed reducer operates smoothly and has no gear chatter such as is present in systems of the prior art. By use of my speed reducer, I may obtain a very large speed change in a relatively small space as compared with the reduction which is possible in the same space with speed reducers of the prior art. By use of my speed reducer, I may achieve an infinite reduction ratio whereby the element which normally is the driven member has zero speed when the driving member 36 rotates. My device may be manufactured as a small, compact, and lightweight unit.

One object of my invention is to provide a ball bearing speed reducer having co-axial driving and driven members.

Another object of my invention is to provide a ball bearing speed reducer which operates smoothly as compared with systems of the prior art having gear chatter.

A further object of my invention is to provide a ball bearing speed reducer which provides a large speed change in a relatively small space.

Still another object of my invention is to provide a ball bearing speed reducer which affords an infinite reduction ratio if desired.

Still another object of my invention is to provide a ball bearing speed reducer which may be manufactured as a small, compact, and lightweight unit.

Other and further objects of my invention will appear from the following description.

In general my invention contemplates the provision of a ball bearing speed reducer including a pair of co-axial bearings, one race of each of which is carried by the driving member. A common retaining ring provides a driving connection between the balls of the respective bearings. I restrain the other race of a first one of the bearings against rotation. The other race of the second bearing may carry the driven member. By varying the characteristics such as pitch diameter, ball diameter or contact angle of one bearing with respect to the other, a large speed reduction is provided between the driving member and the other race of the second bearing.

In the accompanying drawings which form part of the instant specification and which are to be read in conjunction therewith and in which like reference numerals are used to indicate like parts in the various views:

FIGURE 1 is a sectional view of my ball bearing speed reducer.

FIGURE 2 is an elevation of the common retainer of my ball bearing speed reducer.

Figure 3:
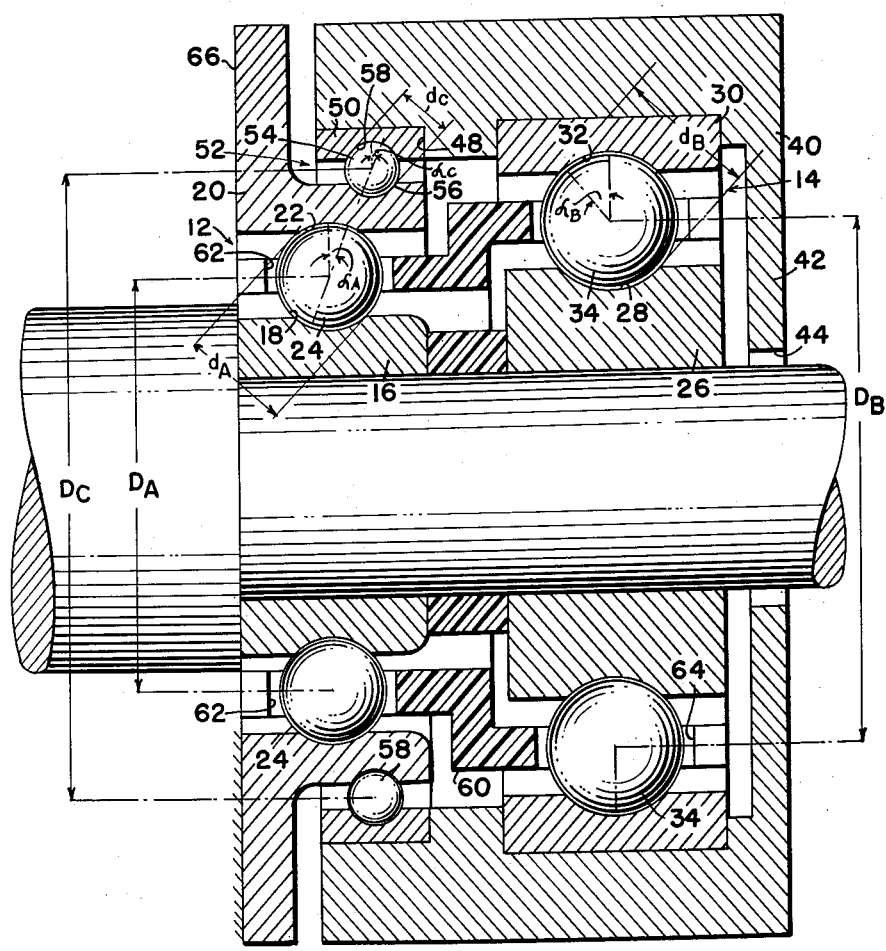
FIGURE 3 is a sectional view of my speed reducer showing different characteristics of the bearings.

Referring now to the drawings, my ball bearing speed reducer, indicated generally by the reference character 10, includes a pair of ball bearings, indicated generally by the respective reference characters 12 and 14. Bearing 12 has an inner ring 16 formed with a race 18 and an outer ring 20 formed with a race 22. I dispose a plurality of rolling elements such as balls 24 between rings 16 and 20 in races 18 and 22.

The bearing 14 has an inner ring 26 formed with a race 28 and an outer ring 30 formed with a race 32. I dispose rolling elements such as balls 34 in the races 28 and 32 between rings 26 and 30.

I mount the rings 16 and 26 on a driving member such as a shaft 36 by means of a force fit or the like. A spacer 38 carried by shaft 36 separates the rings 26 and 28. I mount the outer ring 30 of the bearing 14 within a housing 40 having an end plate 42 provided with an opening 44 through which the shaft extends. Ring 30 may rest against an annular shoulder 46 formed on the plate 42.

I form the housing 40 with an internal annular recess 48 for receiving the outer ring 50 of a third bearing indicated generally by the reference character 52. Bearing 52 has rolling elements such as balls 54 which ride in respective races 56 and 58 formed in the outer ring 20 of bearing 12 and in the outer ring 50 of the bearing 52. It will be seen that ring 20 provides the inner race 56 of the bearing 52 as well as the outer race 22 of the bearing 12.

As is known in the art, the contact angle of a bearing is the angle formed by a load line passing through the contact points of the balls and raceways and a line perpendicular to the axis of rotation of the bearing. It will further be appreciated that the third bearing 52 of my assembly acting through housing 40 and through ring 20 causes the other two bearings 12 and 14 to be preloaded so as to have predetermined contact angles $\alpha_A$ and $\alpha_B$ and as shown in the drawing. As will be apparent from the following description, this preloading, together with the other characteristic differences of the bearings 12 and 14, permits me to construct my speed reducer as a readily installable unit affording a predetermined speed reduction.

I provide the balls 24 and 34 of the bearings 12 and 14 with a common cage 60 having openings 62 for receiving the balls 24 and having openings 64 for receiving the balls 34. I form the ring 20 with an annular flange 66 secured to a suitable stationary support (not shown).

In order to explain the manner in which our speed reducer 10 provides a speed reduction, let:

$D_A$ = the pitch diameter of bearing 12.
$D_B$ = the pitch diameter of bearing 14.
$D_C$ = the pitch diameter of bearing 52.
$d_A$ = the ball diameter of balls 24.
$d_B$ = the ball diameter of balls 34.
$d_C$ = the ball diameter of balls 54.
$\alpha_A$ = the contact angle of balls 24.
$\alpha_B$ = the contact angle of balls 34.
$\alpha_C$ = the contact angle of balls 54.
$n_c$ = the speed of rotation of the common cage 60.
$n_1$ = the speed of rotation of shaft 36 and inner rings 16 and 26.
$n_0$ = the speed of rotation of the outer rings 20 and 30 if both these rings were free to rotate.

It is well known that the relation of cage speed to the outer and inner ring speeds of a ball bearing may be expressed by the relationship:

(1) $\quad n_c = \frac{1}{2}[n_o + n_i + (n_o - n_i)d/D \cos \alpha]$

For the purpose of explanation let us write three expressions in each case indicating that only one characteristic of the two bearings differs with the other characteristics being identical. The effects of differences in the individual characteristics of the bearings 12 and 14 can be demonstrated in the following manner. First, let us assume that $\alpha_A$ equals $\alpha_B$ and that $D_B$ equals $D_A$. With these relationships it can be demonstrated that:

(2) $\quad n_{oA}/n_i = \dfrac{d_A - d_B}{D_A/\cos \alpha_A + d_A}$

It will be obvious from Equation 2 that for a bearing in which $d_A$ differs from $d_B$ the numerator of the equation is less than the denominator.

Next assume that $\alpha_A$ equals $\alpha_B$ and that $d_A$ equals $d_B$. With these relationships it can be demonstrated that:

(3) $\quad n_{oA}/n_i = \dfrac{1 - D_A/D_B}{1 + D_A/(d_A \cos \alpha_A)}$

From Equation 3 it will be clear that if the pitch diameter $D_A$ of bearing 12 differs from the pitch diameter $D_B$ of bearing 16 then the numerator of Equation 3 is less than the denominator.

Finally, let us assume that $D_A$ equals $D_B$ and that $d_A$ equals $d_B$. With these relationships it can be shown that:

(4) $\quad n_{oA}/n_i = \dfrac{\cos \alpha_A - \cos \alpha_B}{D_A/d_A + \cos \alpha_A}$ It will be seen from Equation 4 that if $\cos \alpha_A$ differs from $\cos \alpha_B$, the numerator of the equation is less than the denominator.

From the foregoing analysis it will be apparent that a difference in any of the characteristics such as pitch diameter, ball diameter or contact angle of bearing 12 from the characteristics of bearing 14 produces a speed reduction.

Whereas in the particular embodiment of my invention shown in the drawings the ring 20 is stationary, the shaft 36 is driven and the ring 30 is free to rotate, we can write the following expression for the ratio of speed of ring 30 to shaft 36:

(5) $\quad n_{oB}/n_i = \dfrac{d_B/D_B \cos \alpha_B - d_A/D_A \cos \alpha_A}{1 + d_B/D_B \cos \alpha_B}$ In use of my speed reducer I first construct my bearing in accordance with the relationships expressed in the equations given hereinabove to provide the desired speed reduction. It will be readily appreciated by those skilled in the art that my speed reducer may be arranged in other ways than that specifically shown in the drawings. For example, the driven and driving members could readily be interchanged.

It will be seen that I have accomplished the objects of my invention. I have provided a ball bearing speed reducer which may afford an infinite speed reduction. My speed reducer provides a co-axial input and output. My speed reducer operates smoothly with no gear chatter such as is present in speed reducers of the prior art. My speed reducer provides a large speed reduction for the space occupied as compared with speed reducers of the prior art. My speed reducer may be constructed as a small, compact, and lightweight unit.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A speed reducer including in combination a first bearing having first and second smooth and coaxial races and rolling elements disposed between said races, a second bearing having first and second smooth and coaxial races and rolling elements disposed between said races, each of said races being an integral element, a common retainer for the rolling elements of said bearings, a shaft, said first races of said bearings being mounted on said shaft for movement therewith, a stationary support, a movable member, the second race of one of said bearings being fixed on said stationary support, the second race of the other of said bearings being secured to said movable member, a third bearing and means mounting said third bearing between said stationary support and said moveable member to position said moveable member with respect to said support so that said first and second bearing elements will be placed under a preload, one of said shaft and said movable member being adapted to be driven at a driving speed to cause the other one of said shaft and said movable member to be driven at a speed having a predetermined relationship to the driving speed.

2. A speed reducer including in combination a first bearing having first and second smooth and coaxial races and rolling elements disposed between said races, a second bearing having first and second smooth and coaxial races and rolling elements disposed between said races, each of said races being an integral element, a common retainer for the rolling elements of said bearings, said first and second bearings being constructed with predetermined different characteristics, a shaft, said first races of said bearing being mounted on said shaft for movement therewith, a stationary support, a movable member, the second race of one of said bearings being fixed to said stationary support, the second race of the other of said bearings being secured to said movable support, a third bearing and means mounting said third bearing between said stationary support and said moveable member to position said moveable member with respect to said support so that said first and second bearing elements will be placed under a preload, one of said shaft and said movable member being adapted to be driven at a driving speed to cause the other of the shaft and the movable member to be driven at a speed having a predetermined relationship to the driving speed.

3. A speed reducer including in combination a first bearing having first and second smooth and coaxial races disposed between the races, a second bearing having first and second smooth and coaxial races and rolling elements disposed between said races, each of said races being an integral element, a common retainer for the rolling elements of said bearings, said first and second bearings being constructed with predetermined different pitch diameters, a shaft, said first races of said bearings being mounted on said shaft for movement therewith, a stationary support, a movable member, the second race of one of said bearings being fixed on said stationary support, the second race of the other of said bearings being secured to said movable member, a third bearing and means mounting said third bearing between said stationary support and said moveable member to position said moveable member with respect to said support so that said first and second bearing elements will be placed under a preload, one of said shaft and said movable member being adapted to be driven at a driving speed to cause the other of said shaft and said movable member to be driven at a speed having a predetermined relationship to the driving speed.

4. A speed reducer including in combination a first bearing having first and second smooth and coaxial races and balls disposed between said races, a second bearing having first and second smooth and coaxial races and balls disposed between said races, each of said races being an integral element, a common retainer for the balls of said bearings, the balls of said first and second bearings having different respective diameters, a shaft, said first races of said bearings being mounted on said shaft for movement therewith, a stationary support, a movable member, the second race of one of said bearings being fixed on said stationary support, the second race of the other of said bearings being secured to said movable support, a third bearing and means mounting said third bearing between said stationary support and said moveable member to position said moveable member with respect to said support so that said first and second bearing elements will be placed under a preload, one of said shaft and said movable member being adapted to be driven at a driving speed to cause the other of said shaft and said movable member to be driven at a speed having a predetermined relationship to the driving speed.

5. A speed reducer including in combination a first bearing having first and second smooth and coaxial races and balls disposed between said races, a second bearing having first and second smooth and coaxial races and balls disposed between said races, each of said races being an integral element, a common retainer for the balls of said bearings, said first and second bearings being constructed with their respective balls forming different contact angles with the associated races, a shaft, said first races of said bearing being mounted on said shaft for movement therewith, a stationary support, a movable member, the second race of one of said bearings being fixed on said stationary support, the second race of the other of said bearings being secured to said movable member, a third bearing and means mounting said third bearing between said stationary support and said moveable member to position said moveable member with respect to said support so that said first and second bearing elements will be placed under a preload, one of said shaft and said movable member being adapted to be driven at a driving speed to cause the other of said shaft and said movable member to be driven at a speed having a predetermined relationship to the driving speed.

References Cited in the file of this patent

UNITED STATES PATENTS

| 1,706,180 | Morison | Mar. 19, 1929 |
| 2,704,459 | Nanni | Mar. 22, 1955 |
| 2,853,899 | Graham et al. | Sept. 30, 1958 |

FOREIGN PATENTS

| 52,181 | Sweden | June 22, 1917 |
| 692,431 | France | Aug. 4, 1930 |
| 923,107 | France | Feb. 10, 1947 |